UNITED STATES PATENT OFFICE.

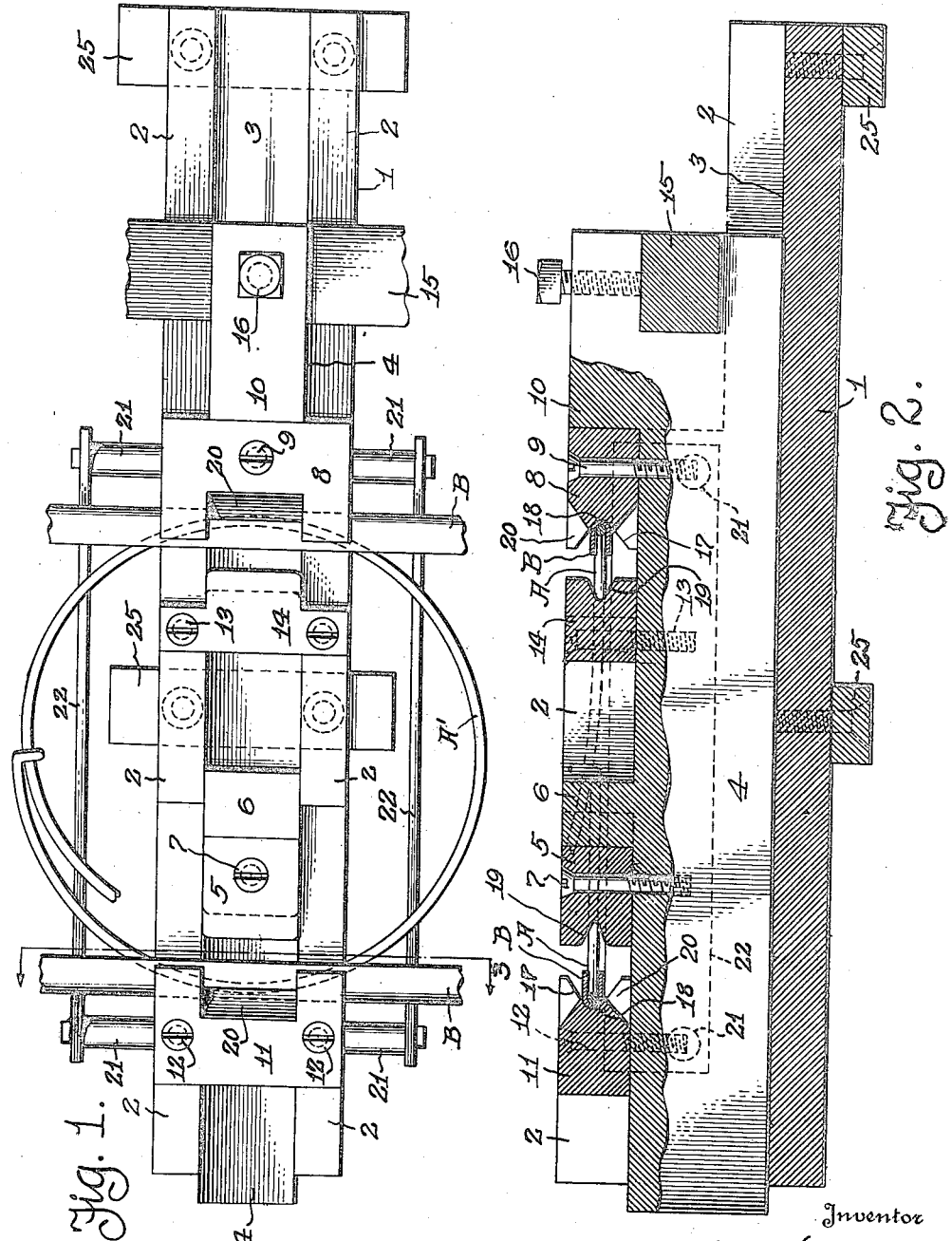

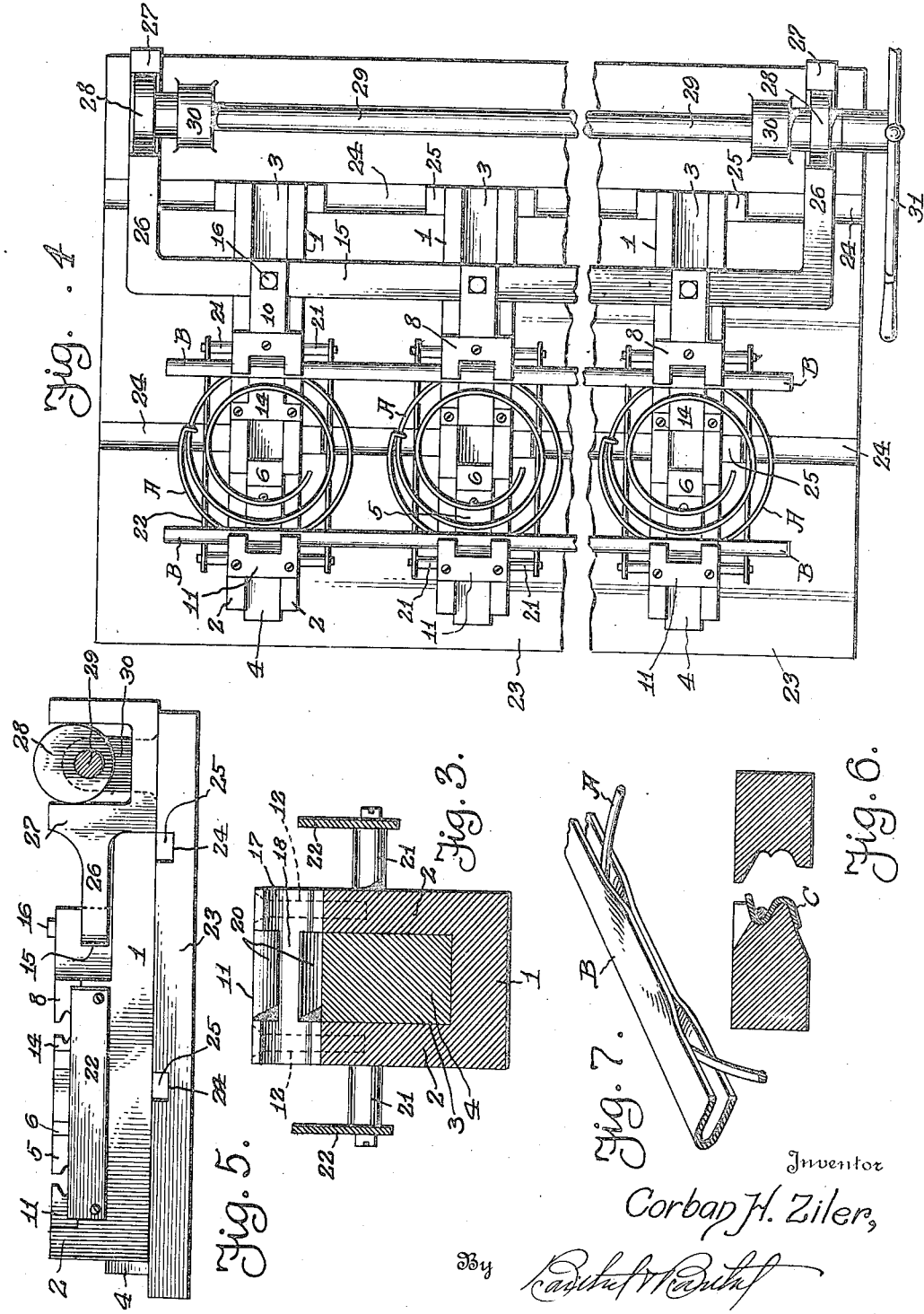

CORBAN H. ZILER, OF WINDSOR, ONTARIO, CANADA, ASSIGNOR OF ONE-HALF TO LEGGETT & PLATT SPRING BED COMPANY, LIMITED, OF WINDSOR, ONTARIO, CANADA, A CORPORATION OF ONTARIO, CANADA.

MACHINE FOR ASSEMBLING FRAME AND SPRING MEMBERS.

1,422,326.       Specification of Letters Patent.     Patented July 11, 1922.

Application filed July 10, 1920. Serial No. 395,234.

*To all whom it may concern:*

Be it known that I, CORBAN H. ZILER, a citizen of the United States of America, residing at Windsor, in the county of Essex, Province of Ontario, Canada, have invented certain new and useful Improvements in Machines for Assembling Frame and Spring Members, of which the following is a specification, reference being had to the accompanying drawings.

Coiled springs, particularly in the construction of seat cushions for automobile seats, are commonly set in a metal holding frame and this frame is commonly formed of sheet metal members each having a channel or groove to receive portions of the lower coils of the springs, said springs being secured in place by bending or otherwise forming these strips into firm contact with the portions of the coils inserted within the grooves of the frame members. This invention relates to a machine for setting springs in their holding frames and for other uses to which it is adaptable, and its object is to facilitate the work and secure accuracy and uniformity in the construction of the product.

A further object is to provide a machine for the purpose which is simple in construction, efficient in operation, and universally adjustable and extensible to suit the work in hand. It is also an object to provide a machine adaptable for securing springs to frame members of various forms, by the simple removal and replacement of certain parts, and further to provide certain other new and useful features in the construction.

With the above and other ends in view the invention consists in the matters hereinafter set forth and more particularly pointed out in the appended claims reference being had to the accompanying drawings in which Figure 1 is a plan view of a device forming a unit of a machine illustrative of the invention;

Fig. 2 is a longitudinal section through the same with a slide forming a part thereof, partly in elevation;

Fig. 3 is a transverse section substantially upon the line 3—3 of Fig. 1;

Fig. 4 is a plan view of a machine embodying a number of the units shown in Figs. 1 and 2;

Fig. 5 is an end elevation of Fig. 3;

Fig. 6 is a sectional detail of a modified form of die blocks; and

Fig. 7 is a perspective detail showing the manner in which a spring and frame member are connected by means of the machine.

As illustrating one form of work which a machine embodying the invention is adapted to perform, coiled springs A of conical form are shown, the lower coils A' of which are to be secured between parallel frame members B comprising strips of sheet metal bent into U-form in cross section and within which channels of said strips, opposite sides of the lower coil of each spring are secured by entering the side portions of the coils into said channels and then compressing the flanges or sides of the channels into firm contact with each other within the coils about the wire, as illustrated in Fig. 7, but it will be understood that a machine embodying the invention may be employed to secure springs or similar members having a different form, to frame members also of different form from that illustrated in Figs. 1, 2, 3 and 5, one modified form of frame member being illustrated in Fig. 6 as a strip C formed S-shape in cross section.

Mechanism is provided for operating upon each spring to secure the frame members thereto and this mechanism forms an operative unit, and any desired member of these units may be assembled into a single machine and simultaneously operated for attaching an entire row of springs consisting of any desired number, to a pair of frame members. Each of these units, as shown in Figs. 1, 2 and 3, comprises a guide member 1 having upstanding flanges 2 along its longitudinal edges forming between them a channel or way 3 for a reciprocable block or bar 4 which is formed at its upper side to provide a seat for a die block 5 seated thereon and against a lug or projection 6 which forms a backing for the block, said block being firmly held within the meeting angle of the upper surface of the bar and side surface of the lug thereon, by screws 7 or other suitable means. In a like manner a seat block 8 is carried by the bar 4 in spaced relation to the die block 5, it being detachably secured in place by a screw against a projection 10 on the bar forming a backing for the seat block. Opposed to the die block 5, is a seat block 11 which is secured in any suitable manner at its ends, as by screws 12, to the side flanges 2 of the guide member 1 and spans the bar 4 which is freely reciprocable in its channel way 3 beneath said seat block 11, and detachably secured in a like manner by screws 13 passing through openings in its ends into screwthreaded openings in the flanges 2, is a die block 14 spanning the channel 3 and bar 4 therein and arranged in opposed relation to the seat block 8. The seat block 11 and die block 14 are therefore stationary, being fixed to the normally stationary guide member 1 and the die block 5 and seat block 8 are movable toward and from the blocks 11 and 14, being carried by the bar 4 which is reciprocable upon the guide member 1, said bar being moved in its guideway 3 by any suitable means, such as a transverse pusher bar 15 adjustably secured to the forward end of the carrying bar 4 by engaging said pusher in a notch in the end of the carrier and securing the same therein by any suitable means, such as a set screw 16.

The end face of each seat block 8 and 11 is formed with a V groove 17 and at the bottom of this groove with a groove 18 which is semi-circular in cross-section and of a size and shape to receive the U-shaped frame members B with the flanges thereof extending outwardly from the groove. The opposed die blocks 5 and 14 each has a V-shaped groove 19 in its end face opposite the groove in each seat block to engage the flanges of the frame members B when the die block 5 is moved toward the seat block 11 and the seat block 8 is moved toward the die block 14 by a longitudinal movement of the carrier 4. These V-grooves thus operate to bend the flanges of the frame members toward each other and form them down upon and around the wire or turn A' of the spring into firm gripping contact therewith to securely unite the frame members and the spring, the central portion of each seat block being cut away as at 20 down to the bottom groove 18 therein and opposite the die blocks, to permit said die blocks to come into contact with the frame members seated on said seat blocks.

Carried by studs 21 extending laterally from the sides of the guide member 1, are plates or strips 22 with their upper edges in the plane of the lower sides of the frame members B when said members are in place within the seats in the seat blocks, said strips 22 thus forming supports for the frame members which are laid thereon transversely of the path of movement of the carrier 4 and within the grooves in the seat blocks, said strips 22 also forming a support for a spring A which is placed thereon with its lower coil A' extending between the die block and seat block at each side of the coil and supported by said supports in such position that the wire forming the coil will enter the channels of the frame members when said spring is moved by the movement of the seat block 8 toward the fixed seat block 11.

In Fig. 3 a machine for assembling a plurality of springs A upon a pair of frame members B is shown, this machine embodying a plurality of the units shown in Figs. 1 and 2, one unit being provided for each spring to be secured to the frame members and means being shown for operating the slides or carriers 4 of the several units simultaneously. The several units are mounted upon a bed or base plate 23 having longitudinal groove or ways 24 in the upper face thereof to receive transverse guides 25 on the lower side of the guide member 1 of each unit so that the several units may be adjusted upon the base plate toward or from each other to give the desired spacing of the several springs, said members 1 being held in any suitable manner (not shown) in the relative position to which they are thus adjusted upon the base. The pusher bar 15 may be operated in any suitable manner to reciprocate the several slides or carriers 4 in their ways, said bar being adjustably secured to all of the slides to simultaneously operate the same and so that these slides may be connected to the bar at any point to which the units are adjusted upon the base, but as shown in Figs. 4 and 5 the ends of the operating or pusher bar are bent at right angles to form forwardly extending arms 26 which arms are formed with yokes 27 to embrace cams 28 secured upon a shaft 29 mounted in bearings 30 upon the base. The shaft 29 may be turned in any suitable manner, as by a lever 31 on the end thereof, to rotate the cams and reciprocate the several carrier slides 4 attached to the operating bar 15.

As previously stated, frame members of any desired channel or other form to receive the opposite sides of the spring coil may be secured to the springs by means of the machine, one such modified form being shown in Fig. 6 at C, it only being necessary to provide die blocks 5 and seat blocks having grooves of the proper configuration in cross-section to receive said frame members and to properly form down the flange or flanges thereof upon the wire forming the coil of the spring to be secured thereto.

In operating the machine, the several slides or carriers 4 being moved to separate the die and seat blocks, the two frame members B are laid transversely of the several supporting plates 22 with the closed side of the channel of each member adjacent the grooves 17 and 18 of the several seat blocks. The several springs A are then set in place upon these supports 22 and the shaft 29 then turned to move the several slides 4. This movement of the slides brings the seat blocks 8 into engagement with the adjacent frame member which member by reason of the V-shape of the grooves in the seat blocks, is caused to seat therein and is moved toward the springs which are supported upon the same supports upon which the frame members rest. The movement of the frame member toward the springs enters said springs in the channels thereof and further movement slides the springs upon their supports into the channel of the opposite frame member, which member is moved thereby toward the stationary seat blocks and seated in the grooves thereof. Continued movement of the several slides 4 brings the die blocks 5 into engagement with the flanges of the frame member at that side of the springs and simultaneously the movable seat blocks move the frame member seated therein into contact with the die blocks 14 and the die blocks thus simultaneously form down the flanges of both frame members upon the opposite sides of the lower coils of the several springs, firmly attaching the frame members to the several springs in parallel relation. As the several seat blocks are all moved the same distance, should one or more spring coils be of larger diameter than the others, these larger coils will be compressed, and thus the frame members will extend in parallel relation after attachment to the springs, giving an even uniform construction, and preventing distortion of the frame. The springs are also evenly and accurately spaced and a uniformity of attachment of the frame members to the springs is secured. The work is greatly facilitated in that an entire row of springs is secured between a pair of frame members in a single operation, and skill is not necessary in performing the operation as it is only necessary for the operator to lay the frame members in place and then set the springs upon their supports, the machine performing the entire operation of accurately positioning the members and springs and securing them together. Springs and frame members of any desired size or form may be operated upon by a simple adjustment of the machine and any desired spacing of the springs may be had. Accuracy and uniformity of the work is insured.

Obviously changes may be made in the construction and arrangement of parts without departing from the spirit of the invention and within the scope of the appended claims, and I do not, therefore, limit myself to the particular construction or arrangement shown.

What I claim is:—

1. A machine for attaching a frame member to one coil of each of a plurality of coiled springs by forming said frame member into engagement with said coils, said machine comprising means for supporting a frame member and a plurality of springs with said frame member extending adjacent that portion of the coils of the several springs to be secured thereto, means adjacent each spring for forming said frame member into engagement with the adjacent portion of the coil of each spring, and means for simultaneously operating said forming means.

2. In a machine for attaching a frame member to a coil of a coiled spring including a fixed member and a movable member, said movable member being adapted to be moved toward and from the fixed member, and one of said members being positioned without the coil of the spring to engage the frame member and force the same into engagement with the portion of the coil to be attached thereto and the other member positioned within the coil in opposed relation to the other member to engage the portion of the coil to be attached to the frame member.

3. A machine as characterized in claim 2, wherein the fixed and movable members are formed, one with a groove forming a seat for the frame member and the other with a forming face to form the frame member into engagement with the spring.

4. In a machine for attaching coiled springs to a frame member having a channel to receive a portion of a coil of each spring, including means for supporting said frame member and said springs in position to enter the channel of the frame member, and means opposed to the portion of each spring coil to which the frame member is to be attached, for forming said frame member into engagement with the coils.

5. In a machine for attaching frame members to diametrically opposite sides of a coil of a coiled spring including a work support for supporting a spring with frame members extending along opposite sides of a coil of said spring and in the horizontal plane of said coil, and members movable relatively and horizontally into and out of engagement with said frame members and coil to simultaneously secure said frame members to opposite sides of said coils.

6. In a machine for attaching coiled springs to a frame member including relatively and horizontally movable opposed forming members, a co-operating work support for supporting a frame member and spring with a coil of said spring in the plane of said frame member and with said member and a portion of said coil between the forming members to be caught and formed into engagement with each other between said forming members upon relative movement of said members.

7. In a machine for attaching coiled springs to a frame member including a work support for supporting the frame member and a spring with a coil of the spring in the plane of said frame member, opposed forming members between which said frame member and coil are supported, and means for moving said forming members relatively to clamp said frame and coil therebetween and form said frame member into engagement with said coil.

8. A machine as characterized in claim 7, wherein the forming members comprise two pairs of members arranged to engage frame members at diametrically opposite sides of a spring supported by said work support, one of the members of each pair being positioned within the coil of the spring to which the frame members are to be attached.

9. A machine as characterized in claims 7 and 8, wherein the forming members carried by the reciprocable member are arranged, one within the coil of the spring and the other outside said coil.

10. In a machine for attaching coiled springs to frame members having channels to receive a coil of said spring, the combination of a guide member, a member reciprocable upon the guide member, and forming members arranged in pairs with one member of each pair carried by said reciprocable member, one of said members carried by said reciprocable member being adapted to engage a frame member within the circle of a coil of the spring to be secured thereto and the other member carried by said reciprocable member being adapted to engage the said coil at a diametrically opposite portion of and outside the coil.

11. In a machine as characterized in claim 10, wherein a horizontally disposed work support is provided and arranged to support frame members and a spring in the plane of movement of said forming members to be engaged at diametrically opposite sides of the coil of the spring between the members of the pairs of members.

12. In a machine of the character described, the combination of a bed, a plurality of guide members adjustably carried by the bed, a reciprocable member on each guide member, forming members arranged in pairs and carried by said guide and reciprocable members and means for simultaneously reciprocating the reciprocable members.

13. In a machine of the character described, the combination of a bed having grooves, a plurality of guide members adjustable along said grooves, a reciprocable member carried by each guide member, pairs of forming members on each guide member and reciprocable member, and a work support carried by each guide member.

14. In a machine of the character described, the combination of a bed, a plurality of guide members adjustably secured upon said bed, a member reciprocable upon each guide member, pairs of forming members, one on the guide member and one on the reciprocable member, means for supporting a former member and springs in position to be engaged between the members of each pair of forming members, and means for reciprocating all of said reciprocable members simultaneously.

In testimony whereof I affix my signature in the presence of two witnesses.

CORBAN H. ZILER.

Witnesses:
LEWIS E. FLANDERS,
ANNA M. DORR.